Oct. 23, 1951  A. A. DE WILDE  2,572,601
SPINNING DEVICE FOR EARRING SCREW CLAMPS
Filed Feb. 16, 1949
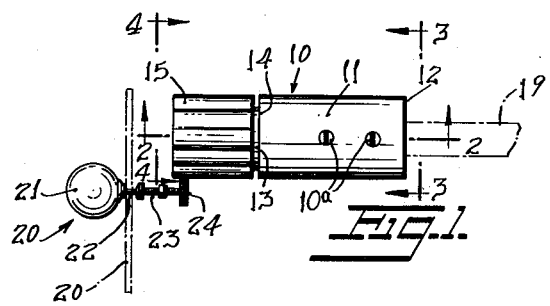
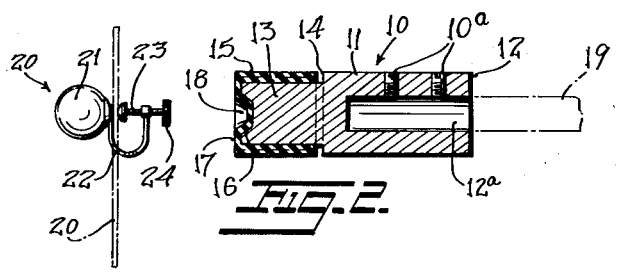
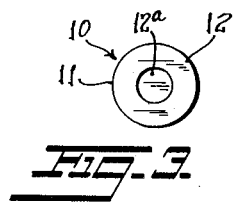
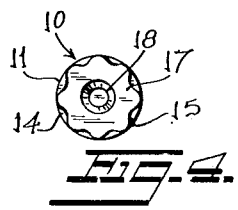
*INVENTOR.*
ANDREW A. DE WILDE
BY
*ATTORNEY*

Patented Oct. 23, 1951

2,572,601

UNITED STATES PATENT OFFICE 2,572,601

SPINNING DEVICE FOR EARRING SCREW CLAMPS

Andrew A. De Wilde, New York, N. Y.

Application February 16, 1949, Serial No. 76,727

2 Claims. (Cl. 81—52.4)

This invention relates to new and useful improvements in assembling appliances, especially for the use in the jewelry and allied trades, and, more particularly, the aim is to provide a spinning device for use in regard to an article comprised of a main body part and a minor part constituting a screw component, as in the case of a screw-on earring, and for employment for substantially instantaneously assembling said article on a display and carrying mount, as a card, incidental to a helical movement of the screw to cause it to grip said mount or pass therethrough.

A further feature of the invention is the provision of a device as above, and which, furthermore, is characterized by an exceedingly simple and inexpensive construction; while at the same time the device is such that it can readily be itself mounted on any spin-actuator, as the shaft of a small electric motor. The new device, moreover, comprises merely a single structure all portions of which may be permanently fixed one relative to another. Nevertheless, when the device is employed for either of the purposes next mentioned, it completes its intended function in the space of a split second, and yet it may be used at will, and while spinning at high speed in a single given direction, either for helically advancing the working end of the screw toward the article's said main body part, or for helically retracting said end of the screw; with the surety that, in either of these two uses of the new device, an automatic slip action occurs for preventing any such over-rotation of the screw as might result in possible breakage thereof or undue strain thereon or on said main body part.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 elevationally shows a now favored embodiment of the device of the invention; with the spin-actuator to which it is attached indicated in dot and dash lines.

Fig. 2 is a longitudinal central section, taken on the line 2—2 of Fig. 1.

Fig. 3 is an end elevational view looking in the direction of the line 3—3 of Fig. 1.

Fig. 4 is an end elevational view looking in the direction of the line 4—4 of Fig. 1.

Referring to the drawing more in detail, the new device as a whole is designated 10; and the same is shown as a single structure all the parts of which are fixed relative to any other, with the single exception of, for instance, a pair of set screws 10a whereby the device may be secured to a spin-actuator of the shaft or shaft-extension type.

The device 10, also as herein shown, comprises, in addition to said set screws or the like, two subdivisions, one of which is a cylindrical member 11. This member 11, desirably made of a metal such as cold rolled steel, and preferably of a circular cross-section for a portion of its length and of annular cross-section for the remainder of its length includes a main hollow band portion 12 this carrying an axially extended bore 12a, and a forward reduced end portion 13. By virtue of this arrangement, an annular shoulder 14, facing toward the free end of the reduced end portion 13, and of a uniform width all around is provided between the portions 12 and 13.

The contour of said forward reduced end portion 13 is therefore, cylindrical; and the same has a peripheral facing of a suitable friction-drive member, such, for example, as a cut off length of a soft rubber tube 15. Preferably, this tube 15 has an inside diameter a few thousandths of an inch greater than the outside diameter of the reduced end portion 13, so that with the inner periphery of the tube 15 in correct frictional grip on the end portion 13 of the metal member 10—desirably such a grip that while there is considerable friction as between the end portion 13 and the tube 15 there can be some slip of the tube 15, relative to the metal member 10 under extra tangential strain on the tube 15.

Coaxially arranged with the bore 12a through the rear portion of the metal member 10, a recess 16 is formed in the front end portion of the member 10; this recess desirably tapered as indicated so that its general direction of extension toward the bore 12a is substantially conical.

The tube 15 is molded with a wall 17 which extends across the front end of the reduced end portion 13 and the wall 17 is formed with a recessed portion 18 which is projected into the recess 16 of the reduced end portion 13, see Fig. 2.

The two set screws 10a secure the member 10 on a suitable spin-actuator, such as the shaft 19 of the small electric motor, not shown.

In Figs. 1 and 2, there is shown in dot and dash lines a support 20, such as a sheet of cardboard for an article of jewelry having a screw-type auxiliary part complementary to a main part whereby helical advance of said auxiliary part, ordinarily having to be laboriously manually effected, is utilized to mount said article of jewelry on the support 20 or the like, either by gripping the card between the working end of said auxiliary part, that is, its end remote from its usual enlarged head, and said main part, or by causing said end of said auxiliary part to pierce the card or to pass through an aperture already carried by the card.

In the present case, the article of jewelry is shown, in Figs. 1 and 2, as constituting one of a pair of screw-on earrings. As here illustrated, said earring comprises a main body including such a decoration as a simulated pearl or other stone 21 and a carrier for the pearl 21 or the like in the form of a stirrup 22 fixedly attached to the pearl 21, and for embracing the dependent lobe of an ear; the upstanding limb of said stirrup being drilled and tapped for taking the threaded shank of a screw 23 having a disc-like head 24. This head 24 ordinarily peripherally thereof is undulated or equivalently roughened or made uneven, for easy finger-twist of the screw in applying the earring to a woman's ear. In Figs. 1 and 2 the stirrup is shown as projected through an opening in the support 20 as is generally known in the art.

Considering earrings alone, particularly when these are of the kind which are sold at relatively low prices, as in the case of so many kinds of so-called costume jewelry, each pair of earrings is customarily mounted on a display and merchandising carrier, such as the support 20. In view of the small margin of profit available to the manufacturer of articles of the price-class just mentioned, a serious and sometimes troublesome item in the general cost has been the time consumed by employees in manually mounting each pair of earrings on its support. A fundamental purpose of the present invention is to avoid this cost hazard.

Use of the new device in accomplishing this is as follows:

As earrings are usually finished in the manufacturing department, the screw 23 is fairly well retracted from the part of the stirrup immediately adjoining the pearl 21 or equivalent. The employee whose duty it is to assemble a pair of earrings on its support 20, and having at hand a stack of the cards, picks one up and inserts an edge portion thereof into the end of the stirrup 22 through the opening in the support to locate the earring at its appointed position on the support. Using his fingers thus to hold these parts temporarily as so arranged, and with the device 10 spinning continuously in one direction and at the selected speed (which can be a rather high one), he inserts the head 24 of the screw 23 into the recess 18, which frictionally grips the head and in a split part of a second helically advances the screw toward the support 20 to effect the intended securement of the earring to the support.

When the screw is finally tightened, the earring and the card are withdrawn from the spinning device. The companion earring is similarly mounted on the same card. Thus, a single employee at a device 10 may mount pairs of earrings on their individual supports at a highly rapid rate. With the metal of the main part of the member 10 quite hard, and/or with the roughening of the periphery of the screw 23 having no sharp edges, as is generally the case, as soon as the screw is fully tightened up, there will be a slip between the tube 15 and the reduced end portion 13, thereby avoiding any breakage of or strain on the screw 23.

Frequently, when an earring is mounted on a card, it may be necessary to rotate the screw in the direction to partly retract the screw. Such retraction may be required when a novice operator finds he has tightened the screw too much to permit easy manual retraction thereof by finger-twist of the ultimate user. Also, an equally important situation may arise where it is necessary to retract the screw to detach the earring from the card. This may be necessary when a price is changed, an advertising slogan is modified or the like is done in regard to the cards, and it is desired to transfer a large stock of earrings, already on old cards, to the new cards. In either of these cases, with the device 10 still spinning in the one direction, the head 24 of the screw is touched to the side of the tube 15, as shown in Fig. 1, to rapidly spin the screw for helical withdrawal of the same relative to the main body of the earring. A slight touch of the head 24 against the side of the tube 15 will ordinarily be sufficient to helically spin the screw to the necessary extent in the retrograde direction, and this in a minute fraction of a second.

It is to be understood that two of these devices may also be used, one rotating in clockwise direction and the other in counter-clockwise direction to turn the screw in one direction or the other.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A device for attachment to a continuously rotating shaft to engage the head of an earring screw or the like to rotate the screw in a direction to mount the earring in a fixed position on a support, comprising a cylindrical member disposed with its axis in alignment with the axis of the shaft, said cylindrical member having a bore in its one end to receive the free end of the shaft, a tube of friction material fitted over the other end portion of said cylindrical member, a wall closing the outer end of said tube and extended across the other end of said cylindrical member, and means on said wall in which the head of the screw can be gripped for turning the screw, said tube having an inside diameter very slightly greater than the external diameter of the said other end portion of said cylindrical member so that said tube will lightly frictionally grip said cylindrical member to slip relative to said cylindrical member when the screw reaches its fully tightened position.

2. A device for attachment to a continuously rotating shaft to engage the head of an earring screw or the like to rotate the screw in a direction to mount the earring in a fixed position on a support, comprising a cylindrical member disposed with its axis in alignment with the axis of the shaft, said cylindrical member having a bore in its one end to receive the free end of the shaft, a tube of friction material fitted over the other end portion of said cylindrical member, a wall closing the outer end of said tube and extending across the other end of said cylindrical member, and means on said wall in which the head of the screw can be gripped for turning the screw, said tube having an inside diameter very slightly greater than the external diameter of the said other end portion of said cylindrical member so that said tube will lightly frictionally grip said cylindrical member to slip relative to said cylindrical member when the screw reaches its fully tightened position, said gripping means comprising an inwardly extended recessed portion concentrically formed in said wall and into which the head of the screw is inserted to be frictionally gripped about its periphery by the walls of said recessed portion, said recessed portion having its walls converged inward to grip heads of various sizes.

ANDREW A. DE WILDE.

REFERENCES CITED

The following references are of record in the file of this patent:

UNITED STATES PATENTS

| Number | Name | Date |
|---|---|---|
| 717,199 | Hollin | Dec. 30, 1902 |
| 769,956 | Pascucillo | Sept. 13, 1904 |
| 853,144 | Wright | May 7, 1907 |
| 1,182,778 | Leaming | May 9, 1916 |
| 1,960,531 | Driscoll | May 29, 1934 |
| 2,338,626 | Emrick | Jan. 4, 1944 |